(12) United States Patent
Kikkawa

(10) Patent No.: US 8,823,781 B2
(45) Date of Patent: Sep. 2, 2014

(54) STEREOSCOPIC IMAGE DISPLAY APPARATUS AND CURSOR DISPLAY METHOD

(75) Inventor: Teruki Kikkawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 946 days.

(21) Appl. No.: 12/945,352

(22) Filed: Nov. 12, 2010

(65) Prior Publication Data

US 2011/0122234 A1 May 26, 2011

(30) Foreign Application Priority Data

Nov. 26, 2009 (JP) .................................. 2009-269266
Aug. 24, 2010 (JP) .................................. 2010-187646

(51) Int. Cl.
*H04N 13/04* (2006.01)

(52) U.S. Cl.
CPC ....... *H04N 13/0497* (2013.01); *H04N 13/0409* (2013.01)
USPC .......................................................... 348/51

(58) Field of Classification Search
None
See application file for complete search history.

(56) References Cited

U.S. PATENT DOCUMENTS

| | | | | |
|---|---|---|---|---|
| 5,590,062 A | * | 12/1996 | Nagamitsu et al. | ................ 703/6 |
| 8,217,990 B2 | * | 7/2012 | Utsugi et al. | .................... 348/42 |
| 8,229,173 B2 | * | 7/2012 | Kawakami | .................... 382/107 |
| 2002/0008906 A1 | | 1/2002 | Tomita | |
| 2007/0182730 A1 | | 8/2007 | Mashitani et al. | |
| 2011/0304714 A1 | * | 12/2011 | Akifusa et al. | .................. 348/54 |

FOREIGN PATENT DOCUMENTS

| | | |
|---|---|---|
| JP | 2001-326947 | 11/2001 |
| JP | 2004-354540 | 12/2004 |
| JP | 2005-136726 A | 5/2005 |

OTHER PUBLICATIONS

"Service Information for Digital Broadcasting System" of Association of Radio Industries and Businesses (ARIB), ARIB STD-B10, Version 4.6-E2, Jun. 6, 2008.

Jun. 18, 2013 Japanese Office Action, that issued in Japanese Patent Application No. 2011-260982.

* cited by examiner

*Primary Examiner* — Nhon Diep
(74) *Attorney, Agent, or Firm* — Cowan, Liebowitz & Latman, P.C.

(57) ABSTRACT

A stereoscopic image display apparatus capable of generating a cursor that moves according to user operation to allow stereoscopic view with a stereoscopic image including a set of images with parallax and capable of combining and displaying the cursor on the stereoscopic image acquires a parallax amount of the stereoscopic image at a location where the cursor is combined and displayed on the stereoscopic image and calculates a moving speed of the cursor. The stereoscopic image display apparatus determines whether the cursor is moving based on the calculated moving speed and generates the cursor including a certain predetermined value as the parallax amount of the cursor if it is determined that the cursor is moving. The stereoscopic image display apparatus generates the cursor by setting the parallax amount of the cursor to the parallax amount of the acquired stereoscopic image if it is determined that the cursor is not moving.

7 Claims, 9 Drawing Sheets

FIG. 5A

| STATE \ EVENT | CURSOR MOVEMENT | CURSOR STOP | |
|---|---|---|---|
| 501 — STOP | UPDATE PARALLAX AMOUNT | UPDATE PARALLAX AMOUNT | 504 |
| | MOVEMENT | STOP | |
| 502 — MOVEMENT | DO NOT UPDATE PARALLAX AMOUNT | GRADUALLY UPDATE PARALLAX AMOUNT | 505 |
| | MOVEMENT | STOPPING | |
| 503 — STOPPING | DO NOT UPDATE PARALLAX AMOUNT | GRADUALLY UPDATE PARALLAX AMOUNT | 506 |
| | MOVEMENT | STOPPING OR STOP | |

NOTATION; (ABOVE: OPERATION, BELOW: STATE AFTER TRANSITION)

FIG. 5B

| STATE \ EVENT | CURSOR MOVEMENT | CURSOR STOP | |
|---|---|---|---|
| 511 — STOP | DO NOT UPDATE PARALLAX AMOUNT | UPDATE PARALLAX AMOUNT | 504 |
| | MOVEMENT | STOP | |
| 502 — MOVEMENT | DO NOT UPDATE PARALLAX AMOUNT | GRADUALLY UPDATE PARALLAX AMOUNT | 505 |
| | MOVEMENT | STOPPING | |
| 503 — STOPPING | DO NOT UPDATE PARALLAX AMOUNT | GRADUALLY UPDATE PARALLAX AMOUNT | 506 |
| | MOVEMENT | STOPPING OR STOP | |

NOTATION; (ABOVE: OPERATION, BELOW: STATE AFTER TRANSITION)

STEREOSCOPIC IMAGE DISPLAY APPARATUS AND CURSOR DISPLAY METHOD

BACKGROUND OF THE INVENTION

1. Field of the Invention

The present invention relates to a stereoscopic image display apparatus and a cursor display method.

2. Description of the Related Art

In recent years, a three-dimensional video production environment is organized along with the progress in digital technologies, and three-dimensional (hereinafter "3D") broadcast has become a reality. In a stereoscopic image display apparatus that receives and displays 3D broadcasts, a film including deflection characteristics is attached to a display panel, and video images for left eye and right eye are displayed in an interlaced format. The observer can observe a display line for left line by the left eye and a display line for right eye by the right eye through deflection glasses to stereoscopically observe the video images. There is also a stereoscopic display apparatus configured to allow the observer to stereoscopically watch the video images by alternately displaying the video images for left eye and right eye and using glasses including liquid crystal shutters to control the video images for left eye and right eye to enter only the left eye and the right eye of the observer, respectively.

Meanwhile, under the advanced satellite digital broadcast standard, a method is studied, in which an input device, such as a mouse, is used to operate the cursor other than the operation by a push-button remote control key using a conventional arrow key. In this case, the user can indicate a displayed object by a cursor operation. However, there is a problem that it is difficult to recognize which object the cursor is pointing at if a cursor of a two-dimensional plane is simply superimposed and displayed for a stereoscopic image such as 3D broadcast.

Japanese Patent Laid-Open No. 2001-326947 (hereinafter, "Document 1") describes a technique of adding the same parallax amount as in the video image to the cursor when the cursor is displayed on a stereoscopic image to facilitate recognizing which object is indicated on the stereoscopic image. Japanese Patent Laid-Open No. 2004-354540 (hereinafter, "Document 2") describes determining overlapping of a stereoscopically displayed object and a cursor and displaying the cursor to be stereoscopically viewed on the near side of the object when there is overlapping. Simple display of which object the cursor is indicating is also an issue in Document 2.

However, the parallax amount of the stereoscopic image at the cursor location is always applied to the cursor in the techniques described in Patent Documents 1 and 2. Therefore, the cursor may move against the user's intention when the cursor is moving. FIG. 11 is a diagram describing a trajectory when a cursor is moved using the conventional techniques. The user can recognize a plane 1302 protruding to the near side relative to a cross-point plane 1301 of parallax amount 0 (Z=0) and a plane 1303 receded to the far side. In this state, if the user attempts to operate the mouse to move the cursor from a spherical object 1304 to a spherical object 1305, the cursor also moves relative to a Z axis, which is the far side, as shown by a movement trajectory 1306 in response to the horizontal slide operation of the mouse. This is because the parallax amount of the stereoscopic image at the cursor location is applied to the cursor. As a result, the display is against the user's intended operation, and there is a problem that the user loses the sight of the cursor.

SUMMARY OF THE INVENTION

The present invention has been made in view of the foregoing problem, and an embodiment of the present invention provides a stereoscopic image display apparatus and a cursor display method for preventing the user from losing the sight of a cursor as much as possible when the cursor with parallax on a stereoscopic image is moved.

According to one aspect of the present invention, there is provided a stereoscopic image display apparatus configured to be able to combine and display a cursor on a stereoscopic image including a set of images with parallax, the cursor moving according to user operation input, the apparatus comprising: a generation unit configured to generate the cursor; an acquisition unit configured to acquire a parallax amount of the stereoscopic image at a location where the cursor generated by the generation unit is combined and displayed; a detection unit configured to detect a moving speed of the cursor at the location where the cursor is combined and displayed; and a determination unit configured to determine whether the cursor is moving based on the moving speed of the cursor detected by the detection unit, wherein the generation unit generates the cursor including a certain predetermined value as the parallax amount of the cursor if the determination unit determines that the cursor is moving, and the generation unit sets the parallax amount of the cursor to a parallax amount based on the parallax amount of the stereoscopic image acquired by the acquisition unit if the determination unit determines that the cursor is not moving.

According to another aspect of the present invention, there is provided a cursor display method by a stereoscopic image display apparatus configured to be able to combine and display a cursor on a stereoscopic image including a set of images with parallax, the cursor moving according to user operation input, the method comprising: a generation step of generating the cursor; an acquisition step of acquiring a parallax amount of the stereoscopic image at a location where the cursor generated in the generation step is combined and displayed; a detection step of detecting a moving speed of the cursor at the location where the cursor is combined and displayed; and a determination step of determining whether the cursor is moving based on the moving speed of the cursor detected in the detection step, wherein the cursor including a certain predetermined value as the parallax amount of the cursor is generated in the generation step if it is determined in the determination unit that the cursor is moving, and the parallax amount of the cursor is set, in the generation step, to a parallax amount based on the parallax amount of the stereoscopic image acquired in the acquisition step if it is determined in the determination step that the cursor is not moving.

Further features of the present invention will become apparent from the following description of exemplary embodiments with reference to the attached drawings.

BRIEF DESCRIPTION OF THE DRAWINGS

FIGS. 5A and 5B are diagrams describing a cursor parallax amount determination operation.

DESCRIPTION OF THE EMBODIMENTS

Hereinafter, embodiments for carrying out the present invention will be illustratively described in detail with reference to the drawings. However, the scope of the present invention is not intended to be limited to functions, relative arrangement, and the like of the constituent elements described in the embodiments unless otherwise specifically stated. Functions, shapes and the like of configurations and components that are once described in the following description are the same as in the first descriptions unless otherwise specifically described again.

First Embodiment

Figure 1:
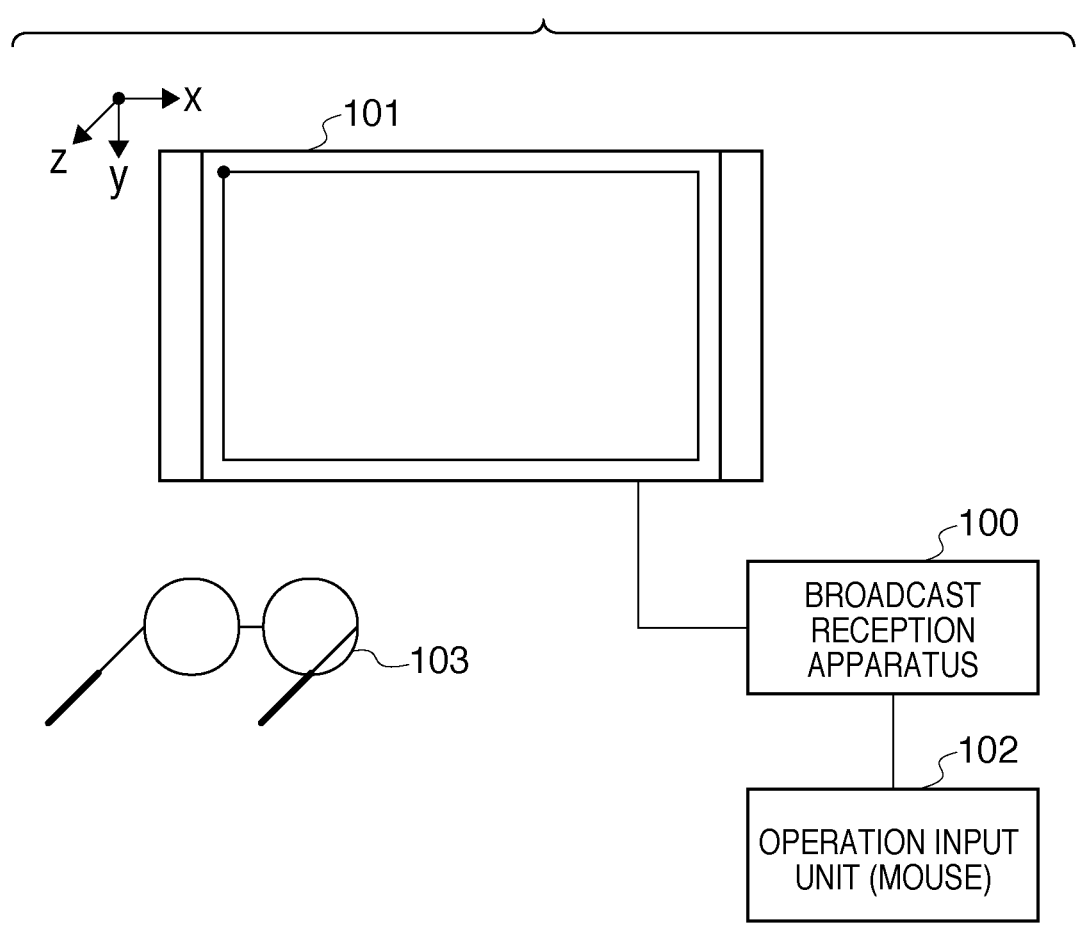
FIG. 1 is a diagram showing a configuration of a stereoscopic image observation system according to embodiments.

FIG. 1 is a schematic diagram showing a configuration of a stereoscopic image observation system to which the present invention can be applied. The stereoscopic image observation system of the present embodiment comprises: a stereoscopic image display apparatus including a broadcast reception apparatus 100, a display panel 101, and a mouse 102; and dedicated glasses 103 for stereoscopic observation. The mouse 102 is an example in which a pointing device is applied as an operation input unit. The operation input unit capable of operating the cursor in the stereoscopic image display is not limited to such an illustration, and various configurations, such as a trackball, a coordinate input apparatus, and an arrow key, can be adopted.

The broadcast reception apparatus 100 is an apparatus that controls a broadcast reception function in the stereoscopic image observation system according to the present embodiment. For example, a mouse 102 is connected to the broadcast reception apparatus 100 through a connection line compliant with the USB standard. The display panel 101 receives and displays a video image output from the broadcast reception apparatus 100. The display panel can be applied not only in systems such as a liquid crystal system and a plasma system. Polarization filters (not shown) are attached to the display panel 101, and a video image with parallax is displayed by lights in different vibration directions. The user can observe the video image displayed on the display panel 101 through the dedicated glasses 103 including the polarization filters in different directions to recognize the video image on the display panel 101 as a 3D video image.

Figure 2:
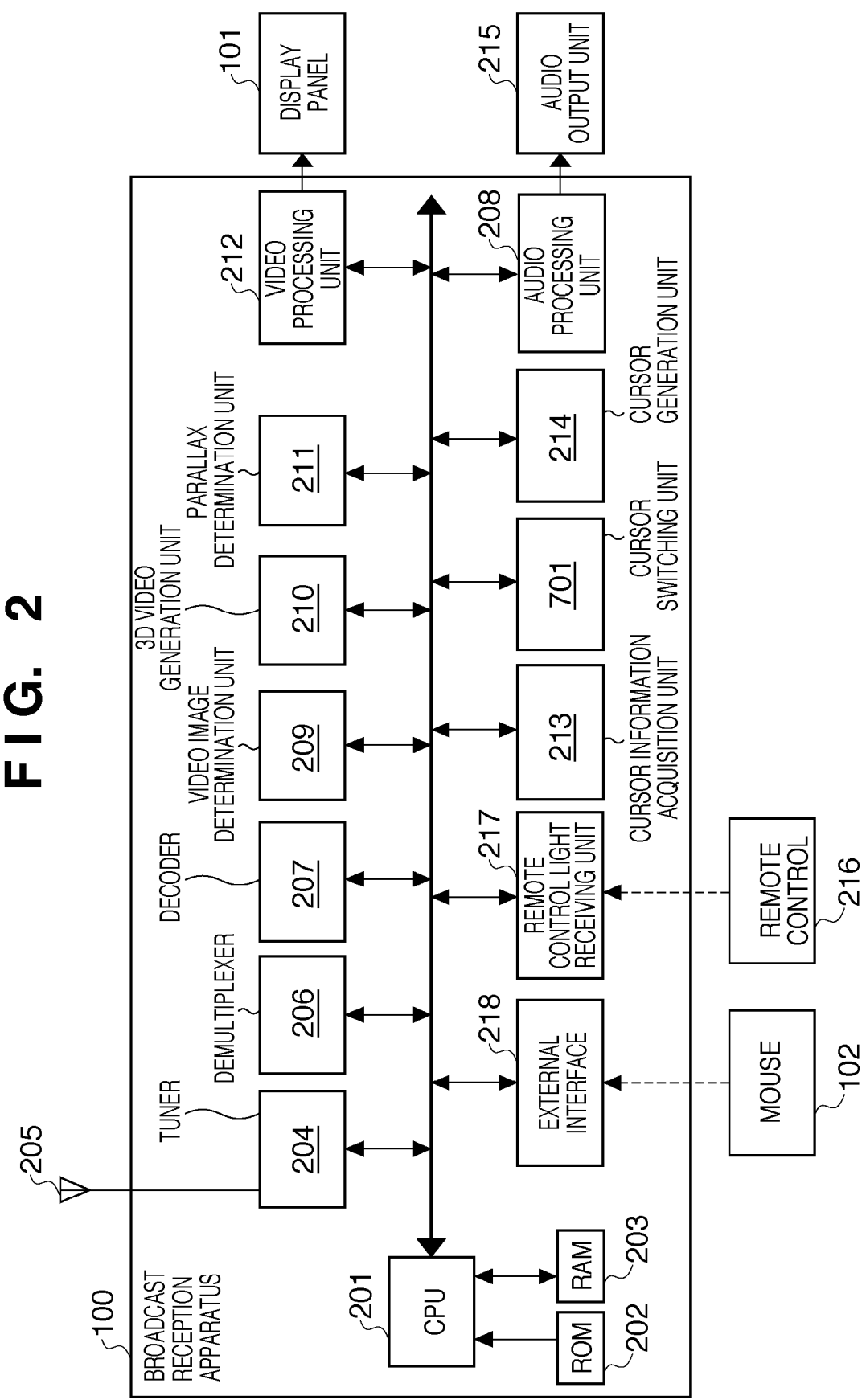
FIG. 2 is a block diagram showing a configuration example of a broadcast reception apparatus according to the embodiments.

FIG. 2 is a block diagram showing a schematic configuration of the broadcast reception apparatus 100 according to the first embodiment. A cursor switching unit 701 is a configuration used in a second embodiment and can be omitted in the first embodiment.

In FIG. 2, a CPU 201 controls the broadcast reception apparatus in accordance with a program stored in a ROM 202. A RAM 203 is a volatile memory, and the RAM 203 is used as a work memory of the CPU 201 and also as a temporary storage area of various data. A tuner 204 demodulates a broadcast wave received from an antenna 205 and outputs video/audio baseband data. A demultiplexer 206 decomposes frames of the data received from the tuner 204 and separates video data, audio data, and program information data. The video data and the audio data separated by the demultiplexer 206 are input to a decoder 207.

The decoder 207 decodes video data encoded to MPEG2 and outputs the video data to a 3D video generation unit 210 if the video component type is 3D video and to a video processing unit 212 if the video component type is 2D video. The video component type will be described later. The decoder 207 also decodes audio data encoded to MPEG2-AAC to convert the data to a linear PCM format and outputs the data to an audio processing unit 208.

The program information data separated by the demultiplexer 206 is input to a video image determination unit 209. The program information data is transmitted in a data configuration defined in a standard "Service Information for Digital Broadcasting System" of Association of Radio Industries and Businesses (ARIB), and the like. The data configuration includes an SDT (Service Description Table) and an EIT (Event Information Table) as main configuration data. The SDT is a table for transmitting information related to organized channels, and the EIT is a table for transmitting information related to programs, such as names of programs, broadcast time, and types of transmitted components. In the present embodiment, the format of the video data is acquired using a component type (component type) inserted to the EIT among the tables. In the present embodiment, 3D video is additionally defined in the currently standardized video component type as format information.

The video image determination unit 209 determines whether the format of the video data in the decoding process is a 2D video or a 3D video based on the component information and notifies the 3D video generation unit of the result. The 3D video generation unit 210 receives the notification of the video format from the video image determination unit 209, and if the format indicates a 3D video, carries out a stereoscopic view process of overlapping parallax images for left eye and right eye to enable the stereoscopic view. For example, frame images are generated, in which odd lines of the display panel form a video image for left eye, and even lines form a video image for right eye. The generated frame images are input to the video processing unit 212.

If the format indicates a 3D video, a parallax determination unit 211 determines a parallax amount of video image corresponding to the cursor location acquired from a cursor information acquisition unit 213 based on the parallax images for left eye and right eye and notifies a cursor generation unit 214 of the parallax amount. The cursor generation unit 214 generates a cursor based on the movement state of the cursor acquired from the cursor information acquisition unit 213 and the parallax notified from the parallax determination unit 211 and inputs the cursor to the video processing unit 212. The video processing unit 212 applies a high-definition process, such as a γ process and a scaling process, to the video signal. The video processing unit 212 superimposes and combines the generated cursor with the location acquired from the cursor information acquisition unit 213 and then converts the cursor to video data, such as an LVDS signal, in accordance with the display panel to output the video data.

The audio processing unit 208 applies a D/A conversion process to the data and outputs the data to an audio output unit 215. A remote control 216 transmits a control signal as an infrared signal in accordance with a user operation. The mouse 102 transmits a control signal and an interrupt signal to an external interface 218 through a connection line in accordance with a user operation. The CPU 201 generates various commands and control signals for controlling the broadcast reception apparatus 100 from infrared signals received by the remote control light receiving unit 217 and interrupt signals input from the external interface 218 and outputs the commands and signals. The CPU 201 may execute programs to realize part or all of the components.

Figure 3:
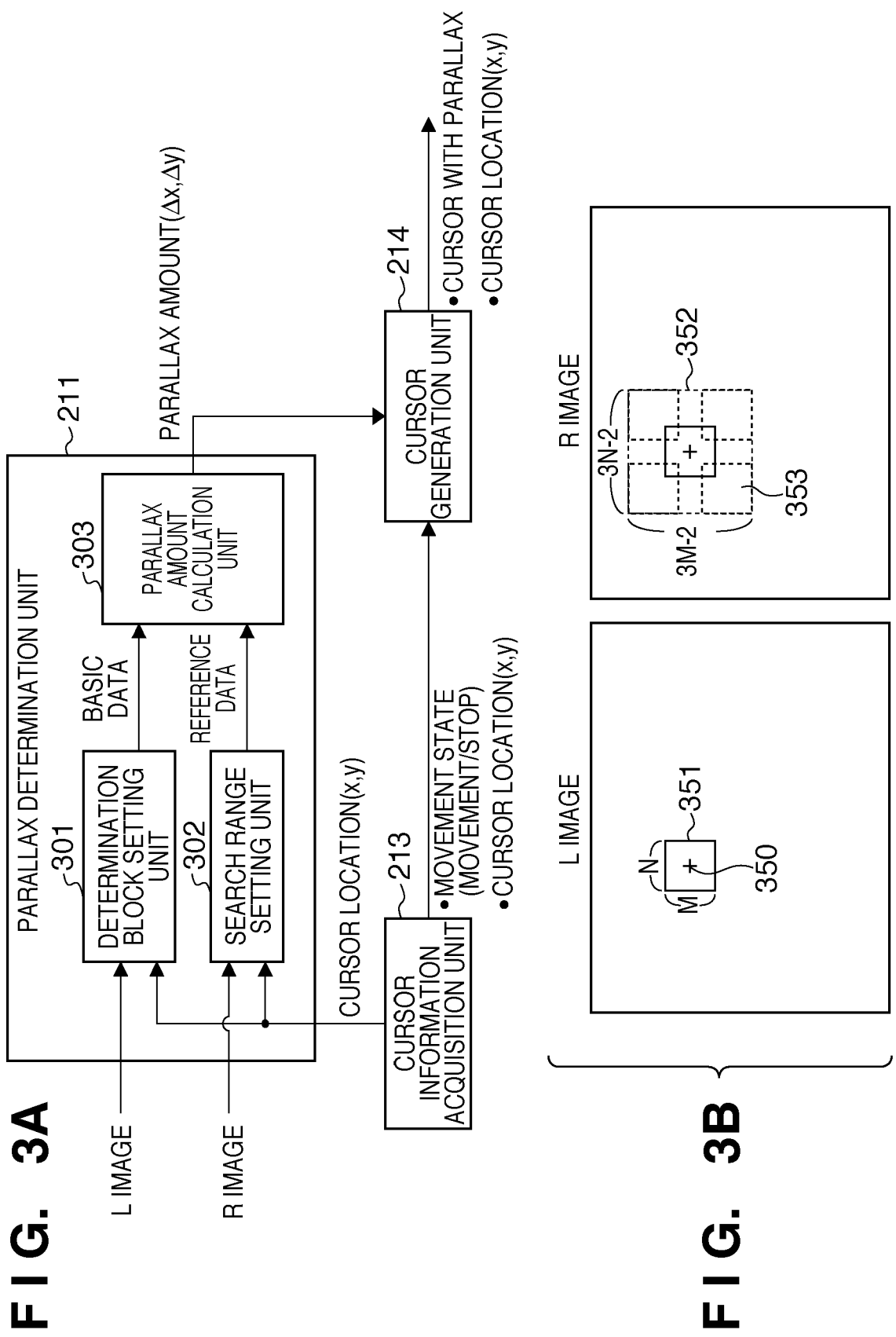
FIGS. 3A and 3B are diagrams describing a data flow according to a first embodiment.

FIG. 3A is a diagram describing a data flow of the parallax determination unit 211, the cursor information acquisition unit 213, and the cursor generation unit 214. The 3D video generation unit 210 inputs a parallax image for left eye (L image) constituting the 3D video to a determination block setting unit 301 and inputs an image for right eye (R image) to a search range setting unit 302. Obviously, the L image may be input to the search range setting unit 302, and the R image may be input to the determination block setting unit 301.

As shown in FIG. 3B, the determination block setting unit 301 sets a predetermined number of determination blocks 351 to the parallax image for left eye based on a current cursor location 350 acquired by the cursor information acquisition unit 213 and outputs the image data of the determination blocks as basic data. In the present embodiment, for example, one determination block 351 (M×N pixels (M=N=4)) with the cursor location 350 as the center is set.

The search range setting unit 302 sets a search range 352, the center of which has the same coordinate (x, y) as the determination block 351, on the image for right eye and sets reference blocks 353 with the same size as the determination block 351 in the search range 352. The search range setting unit 302 outputs the image data of the reference blocks 353 as reference data. In the present embodiment, for example, a block shifted by n pixels in one of the vertical and horizontal directions (1≤n<M in the case of the vertical direction and 1≤n<N in the case of the horizontal direction (1≤n<4 in the present embodiment) relative to the determination block 351 is set as the reference block 353. Therefore, the size of the search range 352 is (3M−2) pixels×(3N−2) pixels. A plurality of reference blocks 353 are set for one determination block 351.

A parallax amount calculation unit 303 applies a matching computation process to the input basic data and reference data and calculates a parallax amount (Δx, Δy) relative to the basic data. More specifically, the parallax amount calculation unit 303 detects the reference block 353 with the highest degree of matching with the determination block 351 in the search range 352 to obtain the parallax amount of video image at the cursor location 350 based on the positional relationship between the determination block 351 and the detected reference block 353. The cursor generation unit 214 generates and outputs the cursor with the parallax amount based on the movement state of the cursor acquired by the cursor information acquisition unit 213, the parallax amount acquired by the parallax determination unit 211, and a result of program processing described below.

Figure 4:
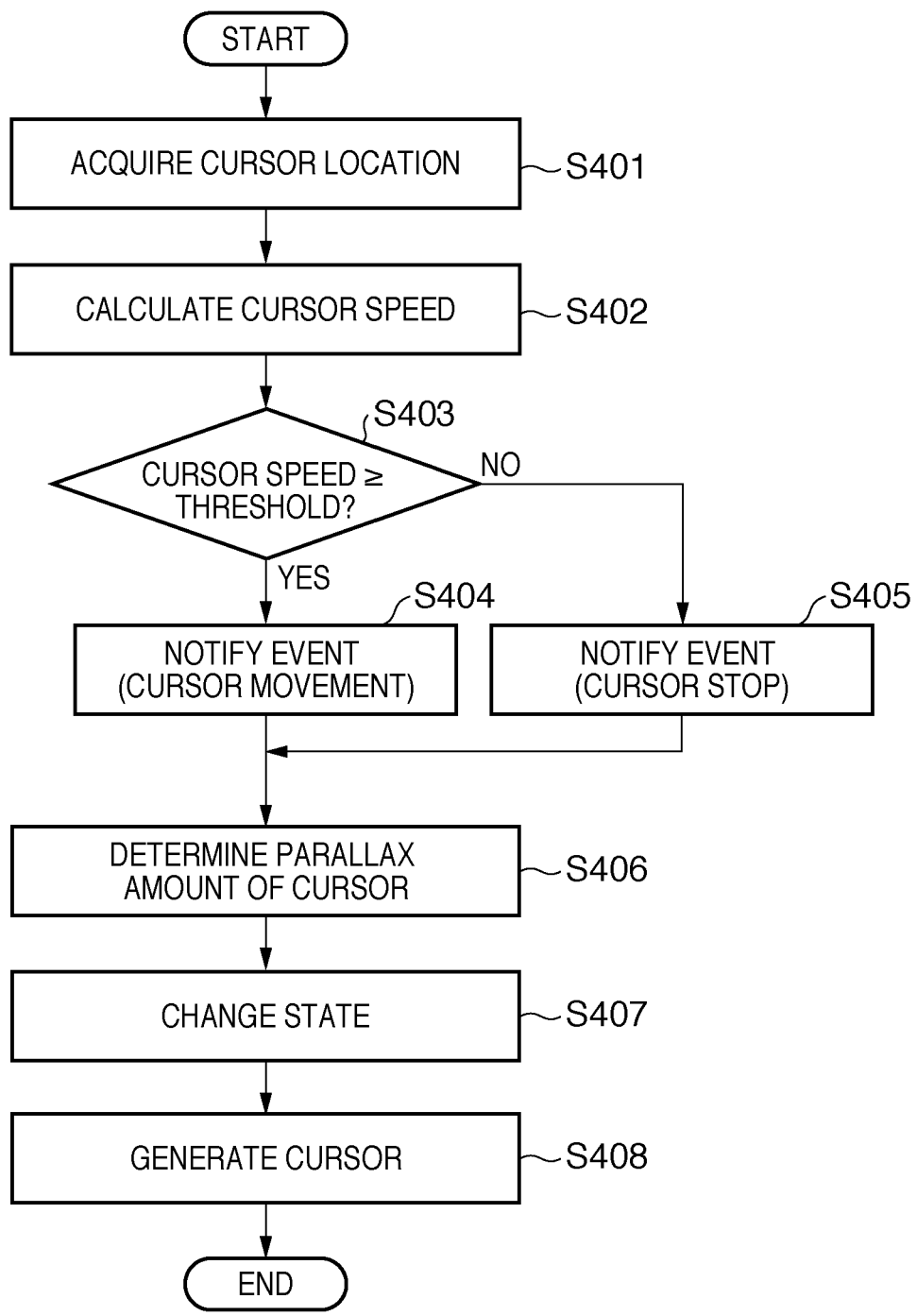
FIG. 4 is a flow chart describing a generation process of a cursor according to the embodiments.

FIG. 4 is a flow chart describing an operation of the cursor generation in the present embodiment. The CPU 201 executes a process shown in the flow chart of FIG. 4 when an interrupt signal is generated by an operation of the mouse 102 by the user and at a predetermined arbitrary polling period. In the present embodiment, for example, a polling process with a period of 50 msec is executed. The external interface 218 notifies the CPU 201 of the interrupt request when the user operates the mouse 102 to move the cursor. The CPU 201 reads out a program for cursor event processing from the ROM 202 and executes the program when the interrupt request is received or at each polling period. When the program for cursor event processing (hereinafter, "user program") is executed, the CPU 201 controls the cursor display by the parallax determination unit 211, the cursor information acquisition unit 213, and the cursor generation unit 214.

The cursor information acquisition unit 213 acquires the current cursor location (x, y) (step S401). In an ARIB-J application under the advanced satellite digital broadcast standard, the user program can implement an HID (Human Interface Device) Listener interface to use a HIDEvent class to acquire detailed information of the cursor event. The user program uses getData( ) as a method of the HIDEvent class to acquire data received from the mouse and calculates the current cursor location where the cursor is combined. The cursor information acquisition unit 213 notifies the parallax determination unit 211 and the cursor generation unit 214 of the acquired cursor location (x, y).

The cursor information acquisition unit 213 calculates the cursor moving speed at the cursor location where the cursor is combined based on the acquired cursor location (step S402). The cursor moving speed at the cursor location where the cursor is combined is calculated using the cursor location when the previous interrupt request is received or the cursor location acquired last time in the polling period, the current cursor location where the cursor is combined, and the time difference at the acquisition of the cursor location. If the cursor moving speed is greater than or equal to a predetermined threshold in the user program, the cursor information acquisition unit 213 determines that the cursor is moving and generates a "cursor movement" event (step S403 (YES), S404). On the other hand, if the cursor speed is smaller than the predetermined threshold, the cursor information acquisition unit 213 determines that the cursor is no longer moved (stopped) or almost stopped and generates a "cursor stop" event (S403 (NO), step S405). If the threshold is 0, the events correspond to simple start and stop of the cursor movement.

When the event is received, the cursor generation unit 214 determines the parallax amount applied to the cursor based on state transition charts shown in FIGS. 5A and 5B (step S406) and changes the internal state of the program (step S407). The cursor generation unit 214 generates a cursor in accordance with the determination result (step S408). More specifically, if the cursor generation unit 214 determines to update the parallax amount of the cursor display, the cursor generation unit 214 updates the parallax amount of the cursor display in accordance with the parallax amount of video image at the cursor location (x, y) determined by the parallax determination unit 211. On the other hand, if the cursor generation unit 214 determines not to update the parallax amount of the cursor display, the cursor generation unit 214 does not update the parallax amount of the cursor display and uses the prior parallax amount to display the cursor. The display location of the cursor generated by the cursor generation unit 214 is the current cursor location (x, y) received from the cursor information acquisition unit 213.

FIGS. 5A and 5B are diagrams describing a cursor parallax amount determination operation in step S406 of FIG. 4. The user program defines processing operations related to the parallax amount of the cursor in the state transition charts of FIGS. 5A and 5B. The ordinate indicates the current state of the cursor, and the abscissa indicates events generated in the user program. The cells at intersecting parts in each state indicate processing operations when the events occur and states after transition.

The case of FIG. 5A will be described. It is assumed that the current internal state of the user program is "stop (indicating that cursor is in stopped state)" in FIG. 5A. In this case, if the "cursor movement" event occurs, the user program updates the cursor parallax amount based on the video image parallax amount at the time of the calculation of the cursor speed that generates the "cursor movement" event. As a result of the operation, the user program performs a final update of the cursor parallax amount just before the cursor movement process described below. The internal state of the user program is changed to "movement" (operation 501 of FIG. 5A).

If the "cursor movement" event occurs when the current internal state of the user program is "movement", the user program does not update the cursor parallax amount (operation 502). More specifically, in the operation 501, the cursor parallax amount is updated based on the video image parallax amount at the time of the calculation of the cursor speed that generates the "cursor movement" event. Therefore, the parallax amount updated when the "cursor movement" event is generated is held as the parallax amount of the cursor in the cursor movement. The internal state of the user program remains "movement" in the operation 502. If the "cursor stop" event occurs when the current internal state of the user program is "movement", the user program sets the current video image parallax amount as the final cursor parallax amount and gradually updates the parallax amount. The internal state of the user program is changed to "stopping (indicating that cursor is in the progress of stopping)" (operation 505).

If the "cursor stop" event occurs when the current internal state of the user program is "stopping", the user program gradually updates the cursor parallax amount as in the operation 505 (operation 506). The internal state remains "stopping" as described above when the cursor parallax amount is gradually updated, and if the final cursor parallax amount and the parallax amount as a result of the gradual update coincide, the internal state of the user program is changed to "stop" (operation 506). The process has an advantage of preventing a problem of the user losing the sight of the cursor as the cursor suddenly pops up or as the cursor moves to the far side after the cursor stop.

If the "cursor movement" event occurs when the current internal state of the user program is "stopping", the user program stops the gradual update of the parallax amount. The internal state is changed to "movement" (operation 503). If the "cursor stop" event occurs when the current internal state of the user program is "stop", the user program updates the cursor parallax amount based on the current video image parallax amount. More specifically, the cursor is always displayed with the same parallax amount as the video image parallax amount in the cursor stop state. The internal state of the user program remains "stop" (operation 504).

In the description, if the "cursor movement" event occurs when the internal state of the user program is "stop", the cursor parallax amount is updated based on the video image parallax amount when the "cursor movement" event is generated. This means that the parallax amount of the display of the cursor is updated when the "cursor movement" event is generated and that the updated parallax amount is maintained during the cursor movement. As shown in FIG. 5B, a process of an operation 511 may be executed in place of the operation 501 of FIG. 5A. In the operation 511 of FIG. 5B, if the "cursor movement" event occurs when the internal state of the user program is "stop", the cursor parallax amount updated during the "cursor stop" event generated just before the generation of the "cursor movement" event is not updated. The cursor speed is calculated based on the difference between the current cursor location and the previous cursor location. Therefore, it can be assumed that the movement of the cursor is started in the "cursor stop" event generated just before the generation of the "cursor movement" event. Therefore, in the case of FIG. 5B, the cursor is displayed with the parallax amount at the start of the movement of the cursor. As in the operation 501 of FIG. 5A, the internal state of the user program is changed to "movement" in the operation 511 of FIG. 5B. Operations 502 to 506 of FIG. 5B are the same as the operations 502 to 506 of FIG. 5A. In this way, the parallax amount of the cursor display does not change during the cursor movement in FIGS. 5A and 5B. In the operation 501 of FIG. 5A, the parallax amount of the cursor display may be updated to 0 (zero) during the occurrence of the "cursor movement" event, and the parallax amount may be maintained during the cursor movement. What is important is that the change in the parallax amount is prohibited during the cursor movement and that the parallax amount is fixed to a certain predetermined value. As a result, the advantage of the present embodiment (reduction in the loss of sight of the cursor during the movement of the cursor) can be obtained.

Figure 6:
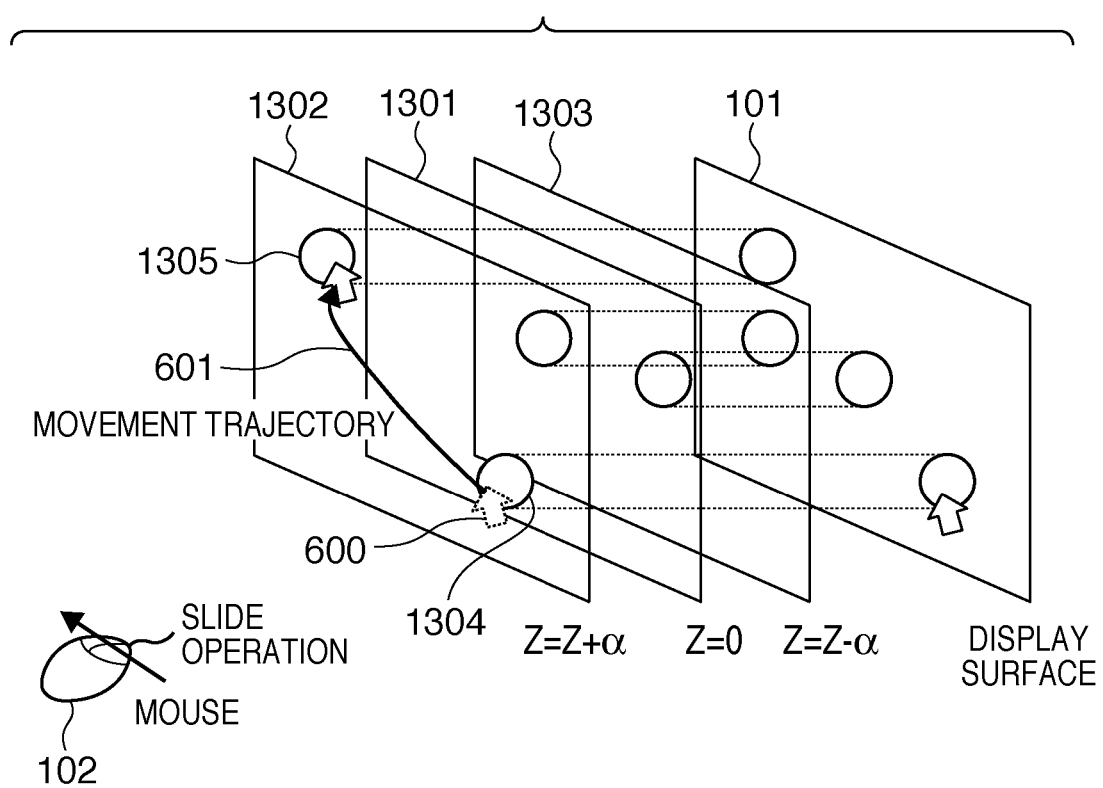
FIG. 6 is a diagram showing a cursor movement trajectory according to the first embodiment.

FIG. 6 is a diagram showing a cursor movement trajectory during the cursor movement according to the first embodiment. The parallax amount of the display of a cursor 600 is fixed to the parallax amount at the start of sliding when the user slides the mouse 102 in the horizontal direction, and the cursor 600 moves in the horizontal direction. Therefore, the cursor 600 moves over a movement trajectory 601. When the user terminates the operation, it can be recognized that a superimposed display is formed with the parallax amount of a video object (spherical object 1305 in the example of FIG. 6) at the cursor location.

According to the configuration, the parallax amount applied in the display of the cursor is fixed when the cursor moves at a predetermined speed or faster in the cursor display on the stereoscopic image. The parallax amount is applied to the cursor display in accordance with the parallax amount of the stereoscopic image at the cursor location if the moving speed of the cursor is slower than the predetermined speed. As a result, the parallax amount does not change during the cursor movement. Therefore, the cursor movement operation corresponds to the slide operation of the user, and there is an advantage of preventing the problem of the loss of sight of the cursor. Furthermore, the parallax amount applied to the cursor is gradually updated after the stop of the cursor movement. This prevents, as much as possible, the problem of losing the sight of the cursor that occurs when the parallax of the cursor suddenly changes. The same parallax as the video object is added to the cursor during the cursor stop or selection. Therefore, which object the cursor is indicating can be simply displayed as before.

Second Embodiment

A process according to a second embodiment of the present invention will be described. The entire configuration of the stereoscopic image observation system in the second embodiment is the same as in the first embodiment (FIGS. 1 and 2). The description of the common parts as in the first embodiment will be omitted as necessary in the description of the second embodiment.

In the second embodiment, the cursor switching unit 701 is added (FIG. 7) to the configuration of the first embodiment (FIGS. 3A and 3B). In addition to the process of acquiring the current cursor location, the cursor information acquisition unit 213 of the second embodiment has a function of predicting a location after movement of the cursor (hereinafter, "next cursor location") at next interrupt timing based on the moving direction and the moving speed of the cursor. Furthermore, the parallax determination unit 211 of the second embodiment determines, for each of the current cursor location and the next cursor location, the parallax amount of video image corresponding to the cursor location. The cursor switching unit 701 compares and determines the positional relationship based on the parallax amount of video image at the movement start location of the cursor and the parallax amount of video image at the next cursor location. The cursor switching unit 701 selects a cursor to be displayed and sets the cursor to the cursor generation unit 214.

Figure 7:
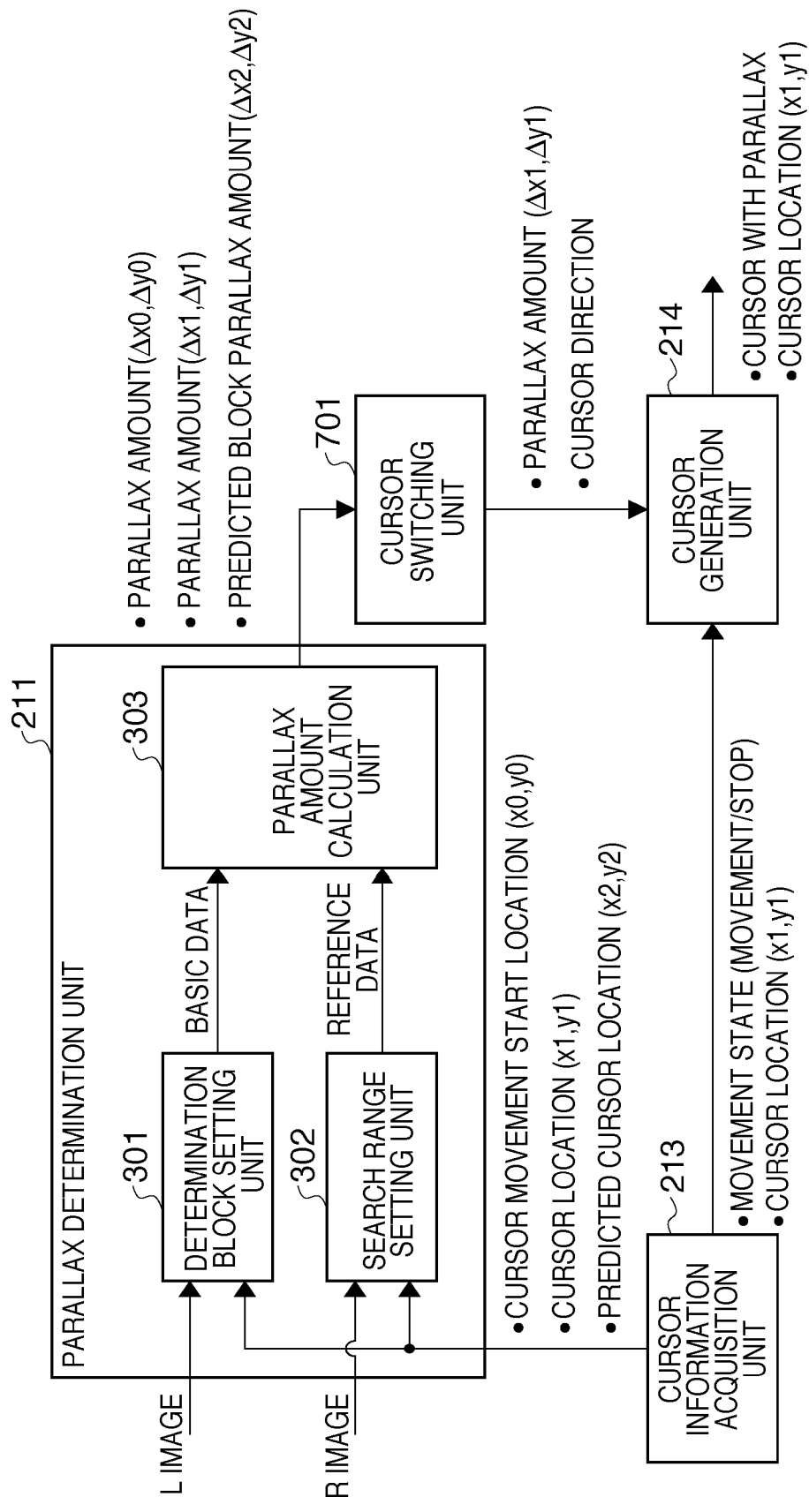
FIG. 7 is a diagram describing a data flow according to a second embodiment.
Figure 8:
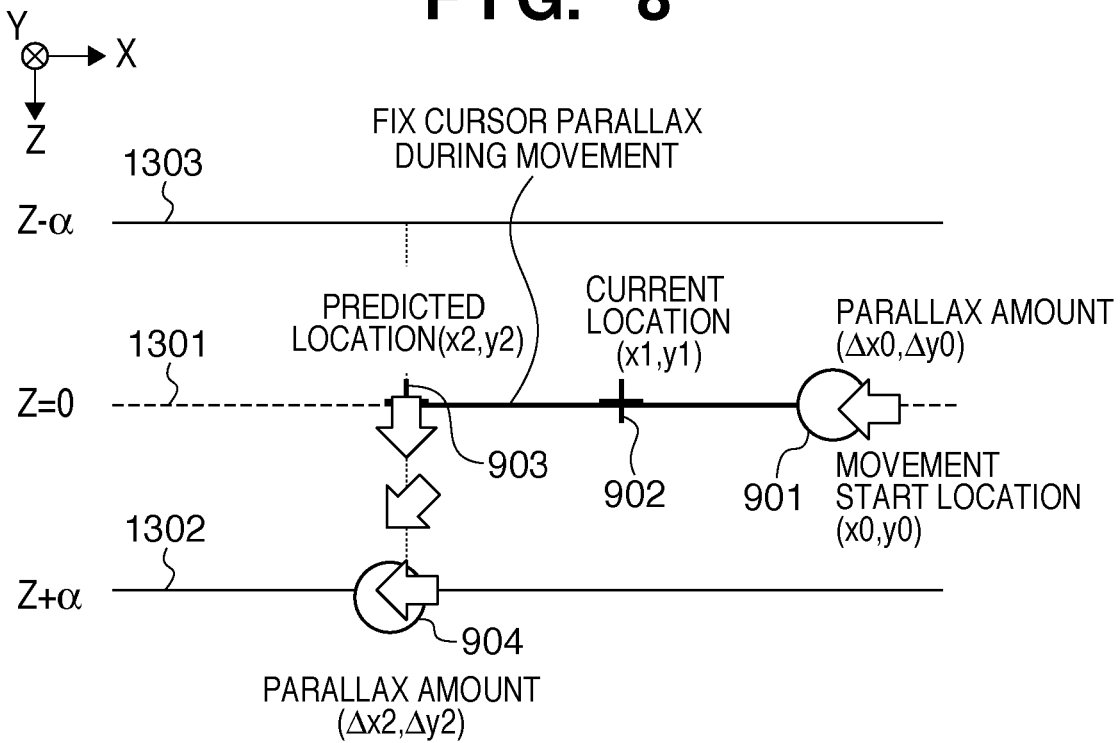
FIG. 8 is a schematic diagram when a stereoscopic image observed by the user is seen from directly above.

A cursor generation process in the second embodiment will be described with reference to FIGS. 7 and 8. FIG. 7 is related to the cursor generation process in the second embodiment and is a diagram describing a data flow between the parallax determination unit 211, the cursor information acquisition unit 213, the cursor generation unit 214, and the cursor switching unit 701. FIG. 8 is a diagram schematically showing an image when the stereoscopic image observed by the user is seen from directly above.

The 3D video generation unit 210 inputs a parallax image for left eye (L image) constituting the 3D video to the determination block setting unit 301 of the parallax determination unit 211 and inputs an image for right eye (R image) to the search range setting unit 302. Obviously, the L image may be input to the search range setting unit 302, and the R image may be input to the determination block setting unit 301. The cursor information acquisition unit 213 notifies the determination block setting unit 301 and the search range setting unit 302 of the current cursor location and the next cursor location.

An outline of a simplified model of the prediction of the cursor location will be described with reference to FIG. 8. For example, it is assumed that the movement start location of the cursor is (x0, y0) (location 901 of FIG. 8) and that the cursor is moved to (x1, y1) during the time between the first interrupt to the next interrupt (location 902 of FIG. 8). In this case, in relation to the current cursor location (x1, y1), a cursor location (x2, y2) at the next interrupt can be predicted to be a location advanced by a distance between the coordinates in the vector direction on the coordinate plane obtained from (x0, y0) and (x1, y1) (location 903 of FIG. 8). More specifically, for example, a location apart by a distance of $\sqrt{((x1-x0)^2+(y1-y0)^2)}$ from the current location (x1, y1) in the (x1−x0, y1−y0) direction is set as the predicted location (x2, y2). The prediction method of the cursor location is not limited to this.

When the cursor advances to (x2, y2), the next cursor location is similarly predicted from the previous cursor location (x1, y1) and the current cursor location (x2, y2). If the user stops the cursor operation and the cursor terminates the movement (stops) at the coordinate (x1, y1), the next cursor movement start location (x0, y0) will be (x1, y1).

The cursor information acquisition unit 213 inputs a first cursor location (x0, y0) as the cursor movement start location and a second cursor location (x2, y2) as the predicted cursor location to the determination block setting unit 301 and the search range setting unit 302.

The determination block setting unit 301 sets predetermined numbers of (one or a plurality of) determination blocks and predicted determination blocks on the parallax image for left eye based on the first cursor location (x0, y0) and the second cursor location (x2, y2) notified from the cursor information acquisition unit 213. The determination block setting unit 301 outputs the video data in the set determination blocks and predicted determination blocks as basic data. In the present embodiment, for example, the determination blocks and the predicated determination blocks have M×N pixels (M=N=4).

In the search range setting unit 302, a search range, the center of which has the same coordinate (x0, y0) as the determination block, is set on the image for right eye, and reference blocks with the same size as the determination block are set in the search range. Similarly, the search range setting unit 302 sets a search range with the predicted determination block (x2, y2) as the center and sets predicted reference blocks in the search range. Video data in the reference blocks and the predicted reference blocks is output as reference data. In the present embodiment, for example, a block shifted by n pixels (1≤n<4) in one of the vertical and horizontal directions relative to the determination block is set as the reference block and the predicted reference block. Details of the blocks are as described in FIG. 3B, and the detailed description will not be described here.

The parallax amount calculation unit 303 applies a matching computation process to the input basic data and reference data and calculates a parallax amount ($\Delta x0$, $\Delta y0$) relative to the basic data and a parallax amount ($\Delta x2$, $\Delta y2$) of the predicted block. In the example of FIG. 8, the parallax amount of a location 904 is calculated. The cursor switching unit 701 calculates the difference between the parallax amount at the cursor movement start location and the parallax amount of the predicted block. The cursor switching unit 701 determines whether the object after cursor movement is on the near side or on the far side of the cursor movement start location.

As described, in the present embodiment, the parallax amount ($\Delta x0$, $\Delta y0$) relative to the basic data and the parallax amount ($\Delta x2$, $\Delta y2$) of the predicted block are compared, and whether the predicted cursor location is on the near side or on the far side of the current cursor location, or whether the predicted cursor location coincides with the current cursor location is determined. The parallax amount ($\Delta x0$, $\Delta y0$) relative to the basic data is not changed during the cursor movement (until the cursor is stopped). Therefore, the parallax amount may not be repeatedly calculated. The parallax amount ($\Delta x0$, $\Delta y0$) relative to the basic data substantially coincides with the parallax amount of the cursor display fixed during the movement. Therefore, the parallax amount of the moving cursor may be used as ($\Delta x0$, $\Delta y0$). Using the parallax amount of the display of the cursor as ($\Delta x0$, $\Delta y0$) can realize a display of a gradual change in the display of the cursor as the parallax amounts of the cursor and the video approach when the parallax amount of the cursor is gradually changed in "stopping" of the cursor.

The cursor switching unit 701 reads out, from the ROM 202, a cursor on the near side if the predicted cursor location is on the near side of the current cursor location, an image on the far side if the predicted cursor location is on the far side of the current cursor location, and a lateral image as a normal instruction shape if the locations coincide. The cursor generation unit 214 then determines the parallax amount of the display of the cursor relative to the image read out from the ROM 202 as in the first embodiment and generates a cursor.

The cursor generation unit 214 can be configured to execute the process to predict the cursor location only in the "stopping" state in the state transition (FIGS. 5A and 5B) of the first embodiment. In the operation of that case, the lateral image as the normal instruction shape is displayed when the cursor is moved by the mouse operation of the user, and if the cursor movement is stopped, the parallax amount is gradually updated, and the cursor is changed to a cursor shape that always indicate the object to display the cursor.

Figure 9:
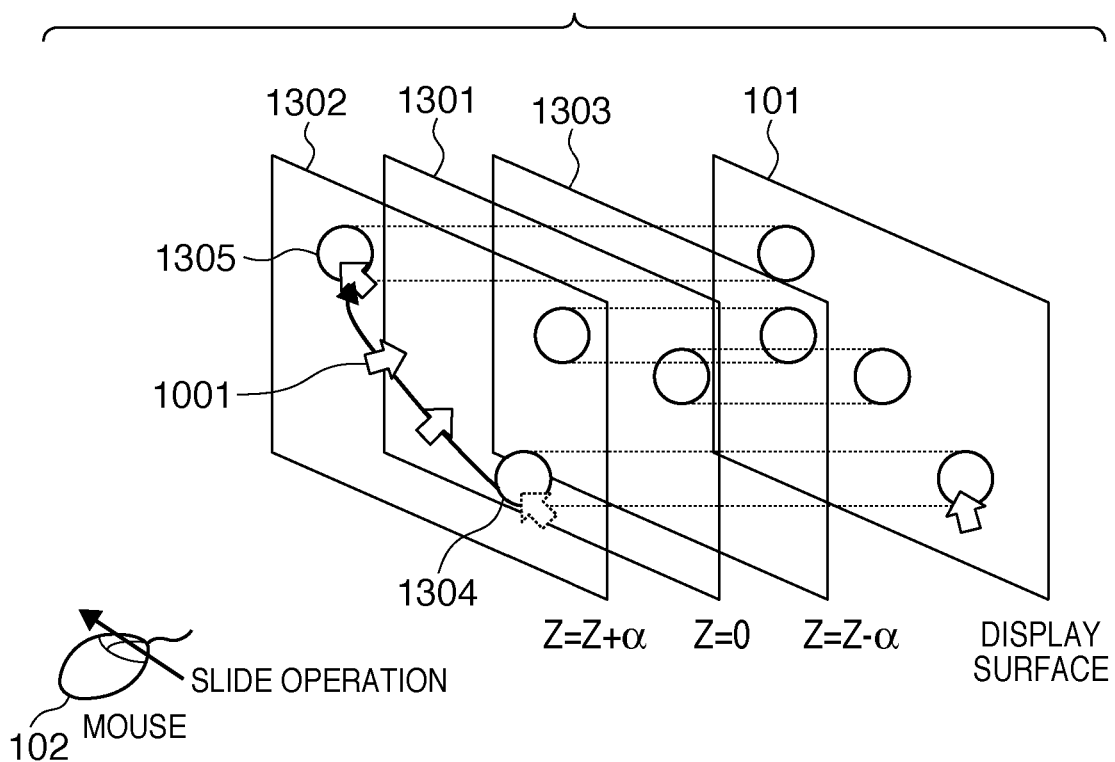
FIG. 9 is a diagram showing a cursor movement trajectory according to the second embodiment.

FIG. 9 is a diagram showing an example of a cursor movement trajectory according to the second embodiment. As in the first embodiment, when the user slides the mouse 102, the cursor moves in the horizontal direction with the parallax amount being fixed to the parallax amount at the start of sliding. When the user terminates the operation, the parallax amount of the display of the cursor is updated in accordance with the parallax amount of video image at the current location of the cursor. At this point, the cursor location is further predicted in the second embodiment, and the display shape of the cursor is switched based on the parallax amount of video image at the current cursor location or at the cursor location just before and based on the parallax amount of video image at the predicted cursor location. In the present embodiment, for example, the direction indicated by the cursor is switched. This allows the user to visually recognize the cursor moving direction relative to the Z-axis direction (far side) after the termination of the mouse operation (cursor 1001 of FIG. 9).

Figure 10A:
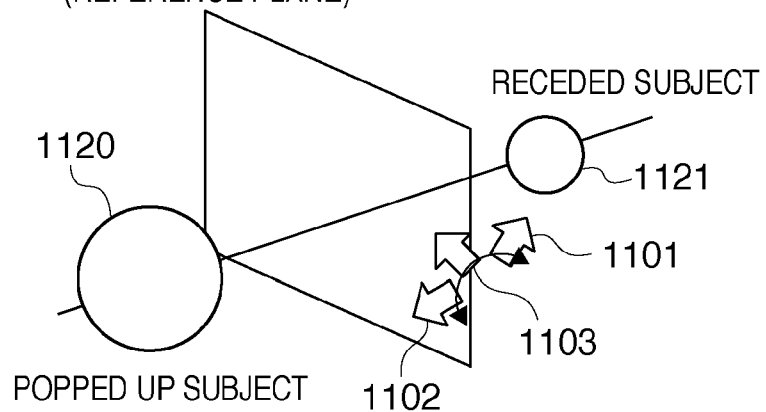
FIGS. 10A and 10B are diagrams describing an example of display when the direction of the cursor is switched.
Figure 10B:
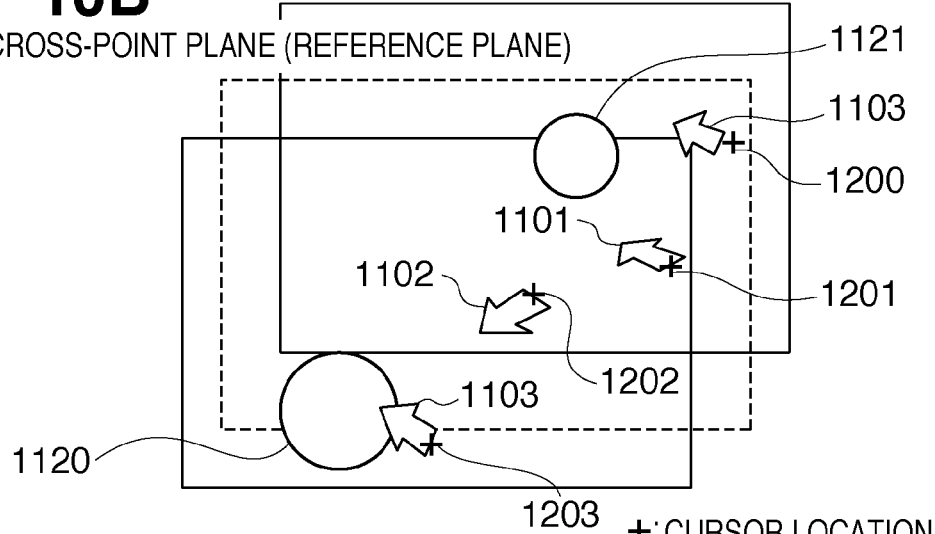
Figure 11:
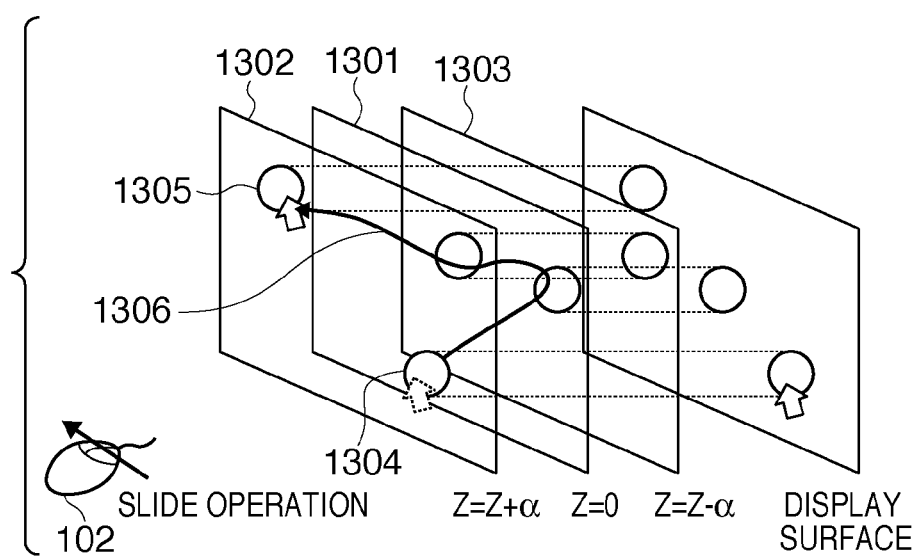
FIG. 11 is a diagram describing a trajectory when a cursor is moved in a conventional technique.

FIGS. 10A and 10B are diagrams showing an example of change in the display shape of the cursor in the second embodiment and are diagrams describing an example of display when the direction of the cursor is switched as an example of change in the display shape. If a cross-point plane of the parallax amount "0" is the current cursor location, the display shapes of the cursor indicating the far side and the near side are illustrated as cursors 1101 and 1102, respectively. A cursor 1103 denotes a display shape when the change in the parallax amount is less than a predetermined value. A spherical object 1120 is an object on the near side of the cross-point plane, and a spherical object 1121 is an object on the far side of the cross-point plane. As shown in FIG. 10B, a case in which the cursor location moves from a location 1200→a location 1201→a location 1202→a location 1203 and stops at a location 1203 will be considered. In this case, the display shapes of the cursor at the locations 1200 to 1203 are illustrated as the cursor 1103→the cursor 1101→the cursor 1102→the cursor 1103, respectively. At the location 1203, as a result of the parallax amount of display of the cursor following the parallax amount of the spherical object 1120 on the near side of the cross-point plane, the parallax amount of the current cursor display and the parallax amount of video image coincide, and the cursor 1103 is selected. Although three types of display shapes of the cursor are illustrated in FIGS. 10A and 10B, more display shapes may be prepared, and the cursor display may be more finely switched in accordance with the size of the difference in the parallax amount.

According to the configuration, the parallax amount applied to the cursor is fixed in the cursor display on the stereoscopic image while the cursor moves at a predetermined speed or faster. The parallax amount of display of the cursor is changed in accordance with the parallax amount of the stereoscopic image at the cursor location if the cursor moves slower than the predetermined speed. In addition, the cursor is switched and displayed based on the parallax amount of video image at the predicted cursor location to allow visual recognition of the advancing direction of the cursor in consideration of the depth direction. As a result, in addition to the first embodiment, the cursor moving direction in the Z axis can be easily predicted when the user terminates the cursor movement, and an advantage of further preventing the problem of the loss of sight of the cursor can be obtained.

According to the present invention, loss of sight of a cursor by the user can be prevented as much as possible when the cursor is moved in a stereoscopic image display apparatus capable of operating the cursor with parallax on a stereoscopic image.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-269266, filed Nov. 26, 2009 and Japanese Patent Application No. 2010-187646, filed Aug. 24, 2010, which are hereby incorporated by reference herein in their entirety.

What is claimed is:

1. A stereoscopic image processing apparatus configured to be able to combine and display a cursor on a stereoscopic image including a set of images with parallax, the cursor moving according to user operation input, the apparatus comprising:

a generation unit configured to generate the cursor;

an acquisition unit configured to acquire a parallax amount of the stereoscopic image at a location where the cursor generated by said generation unit is combined and displayed;

a detection unit configured to detect a moving speed of the cursor at the location where the cursor is combined and displayed; and a determination unit configured to determine whether the cursor is moving based on the moving speed of the cursor detected by said detection unit, wherein said generation unit generates the cursor including a certain predetermined value as the parallax amount of the cursor if said determination unit determines that the cursor is moving, and said generation unit sets the parallax amount of the cursor to a parallax amount based on the parallax amount of the stereoscopic image acquired by said acquisition unit if said determination unit determines that the cursor is not moving.

2. The apparatus according to claim 1, wherein said generation unit determines the certain predetermined value based on the parallax amount of the stereoscopic image acquired by said acquisition unit if said determination unit determines that the cursor is moving.

3. The apparatus according to claim 1, wherein said generation unit sets the parallax amount of the cursor to zero if said determination unit determines that the cursor is moving.

4. The apparatus according to claim 1, wherein said generation unit uses the parallax amount of the cursor generated when said determination unit has determined that the cursor is not moving as the certain predetermined value to generate the moving cursor if said determination unit determines that the cursor is moving after determining that the cursor is not moving.

5. The apparatus according to claim 1, wherein
said detection unit detects a moving speed and a moving direction of the cursor,
the stereoscopic image processing apparatus further comprises a prediction unit configured to predict a location after movement of the cursor based on the moving speed and the moving direction of the cursor detected by said detection unit,
said acquisition unit acquires the parallax amount of the stereoscopic image at the location after movement of the cursor predicted by said prediction unit, and
said generation unit changes the shape of the cursor based on the difference between the parallax amount of the stereoscopic image to which the cursor is combined and the parallax amount of the stereoscopic image at the predicted location after movement.

6. The apparatus according to claim 5, wherein
the cursor has a shape indicating a specific direction, and said generation unit sets the cursor as an image with a shape indicating the stereoscopic image at the location after movement predicted by said prediction unit.

7. A cursor display method by a stereoscopic image display apparatus configured to be able to combine and display a cursor on a stereoscopic image including a set of images with parallax, the cursor moving according to user operation input, the method comprising:
    a generation step of generating the cursor;
    an acquisition step of acquiring a parallax amount of the stereoscopic image at a location where the cursor generated in said generation step is combined and displayed;
    a detection step of detecting a moving speed of the cursor at the location where the cursor is combined and displayed; and
    a determination step of determining whether the cursor is moving based on the moving speed of the cursor detected in said detection step, wherein
    the cursor including a certain predetermined value as the parallax amount of the cursor is generated in said generation step if it is determined in said determination unit that the cursor is moving, and the parallax amount of the cursor is set, in said generation step, to a parallax amount based on the parallax amount of the stereoscopic image acquired in said acquisition step if it is determined in said determination step that the cursor is not moving.

* * * * *